(12) United States Patent
Schlögl et al.

(10) Patent No.: US 11,858,843 B2
(45) Date of Patent: Jan. 2, 2024

(54) DEVICE FOR ANNEALING GLASS PANES

(71) Applicant: sedak GmbH & Co. KG, Gersthofen (DE)

(72) Inventors: Fritz Schlögl, Stadtbergen (DE); Alexander Dechand, Dillingen (DE)

(73) Assignee: sedak GmbH & Co. KG, Gersthofen (DE)

( * ) Notice: Subject to any disclaimer, the term of this patent is extended or adjusted under 35 U.S.C. 154(b) by 153 days.

(21) Appl. No.: 16/982,748

(22) PCT Filed: Jul. 31, 2019

(86) PCT No.: PCT/EP2019/070660
§ 371 (c)(1),
(2) Date: Sep. 21, 2020

(87) PCT Pub. No.: WO2020/057837
PCT Pub. Date: Mar. 26, 2020

(65) Prior Publication Data
US 2021/0009458 A1    Jan. 14, 2021

(30) Foreign Application Priority Data

Sep. 21, 2018  (DE) ...................... 10 2018 123 284.5

(51) Int. Cl.
*C03B 25/08* (2006.01)
*C03B 27/044* (2006.01)
*C03B 27/04* (2006.01)

(52) U.S. Cl.
CPC .......... *C03B 25/08* (2013.01); *C03B 27/0404* (2013.01); *C03B 27/044* (2013.01)

(58) Field of Classification Search
CPC ....... C03B 27/044; C03B 25/08; C03B 29/08; C03B 35/185
See application file for complete search history.

(56) References Cited

U.S. PATENT DOCUMENTS 1,955,163 A * 4/1934 Adams .................... C03B 25/08
65/348
2,948,990 A * 8/1960 White ................. C03B 27/0445
65/349
(Continued)

FOREIGN PATENT DOCUMENTS

CN   101754937 A  *  6/2010  ............. C03B 18/16
CN   108298802 A  *  7/2018  ........... C03B 27/044
(Continued)

OTHER PUBLICATIONS

International Search Report dated Oct. 11, 2019 for PCT/EP2019/070660 filed Jul. 31, 2019.
(Continued)

*Primary Examiner* — Alison L Hindenlang
*Assistant Examiner* — Steven S Lee
(74) *Attorney, Agent, or Firm* — Paul D. Bianco; Fleit Intellectual Property Law

(57) ABSTRACT

A device for annealing glass panes includes rollers for transporting the glass panes and two sets of slit-shaped nozzles, which run parallel to the axes of the rollers and from which cooling air can be directed onto both sides of the glass panes. In the device, cooling air acts as effectively as possible on the two surfaces of the glass pane, and anisotropies and stresses within the glass are reduced. This can be achieved by each nozzle being formed as a continuous flow channel, which extends over the width of the glass panes and on both parallel running sides of which partitions are arranged, for the forming of a flow pocket assigned to this flow channel. The cooling air that comes back from the glass panes is returned between this flow channel and the associated partitions.

13 Claims, 1 Drawing Sheet

(56) References Cited

U.S. PATENT DOCUMENTS

| | | | | |
|---|---|---|---|---|
| 3,607,198 | A | * | 9/1971 | Meunier ............... C03B 27/016 414/676 |
| 3,672,861 | A | * | 6/1972 | Ritter .................... C03B 35/185 65/351 |
| 3,881,907 | A | * | 5/1975 | Starr ................... C03B 27/0413 65/25.2 |
| 3,936,291 | A | * | 2/1976 | McMaster ............... F28C 3/005 65/273 |
| 4,046,543 | A | * | 9/1977 | Shields ............... C03B 27/0413 65/25.2 |
| 4,204,845 | A | * | 5/1980 | Shields ............... C03B 27/0404 65/25.2 |
| 4,236,909 | A | * | 12/1980 | Thomas ............... C03B 27/0413 65/351 |
| 4,515,622 | A | * | 5/1985 | McMaster ........... C03B 27/0404 65/351 |
| 4,773,926 | A | * | 9/1988 | Letemps ............. C03B 27/0404 65/351 |
| 4,820,327 | A | | 4/1989 | Letemps et al. |
| 5,011,525 | A | * | 4/1991 | McMaster ............. C03B 27/044 65/351 |
| 5,032,162 | A | | 7/1991 | Reunamaki ......... C03B 27/0404 65/114 |
| 5,562,750 | A | | 10/1996 | Letemps et al. |
| 5,647,882 | A | * | 7/1997 | Thiessen ................. C03B 25/08 34/635 |
| 5,672,191 | A | * | 9/1997 | Kormanyos ............ C03B 29/08 65/273 |
| 6,064,040 | A | * | 5/2000 | Muller .................. C03B 27/012 219/400 |
| 7,383,700 | B2 | * | 6/2008 | Erdmann ................ C03B 29/08 65/273 |
| 2006/0121281 | A1 | * | 6/2006 | Tamai ................. C03B 27/0445 428/410 |
| 2006/0150683 | A1 | * | 7/2006 | Lewandowski ......... C03B 35/18 65/114 |
| 2007/0122580 | A1 | | 5/2007 | Krall, Jr. et al. |
| 2017/0334760 | A1 | * | 11/2017 | Kylväjä .............. C03B 27/0404 |
| 2018/0079675 | A1 | * | 3/2018 | Afzal ...................... C03B 25/08 |

FOREIGN PATENT DOCUMENTS

| | | | |
|---|---|---|---|
| CN | 108483882 A * | 9/2018 | ............. C03B 25/08 |
| DE | 69312169 T2 | 2/1998 | |
| DE | 10 2008 045416 A1 | 3/2010 | |
| EP | 558912 A1 * | 9/1993 | ......... C03B 27/0404 |
| EP | 0558912 A1 * | 11/1995 | ......... C03B 27/0404 |
| EP | 0968970 A2 | 1/2000 | |
| EP | 0968970 A2 * | 1/2000 | ......... C03B 27/0404 |
| EP | 1957419 A2 | 8/2008 | |
| EP | 2853517 A1 | 4/2015 | |
| FR | 1516644 A | 3/1968 | |
| FR | 2498174 A1 * | 7/1982 | ............. C03B 29/08 |
| GB | 1198875 A | 7/1970 | |
| GB | 2094290 A * | 9/1982 | ......... C03B 27/0404 |
| JP | 2004067416 A * | 3/2004 | ......... C03B 27/0404 |
| JP | 2005001919 A * | 1/2005 | ......... C03B 23/0307 |
| WO | WO-03101898 A1 * | 12/2003 | ......... C03B 27/0404 |
| WO | WO-2014112415 A1 * | 7/2014 | ............. C03B 25/08 |

OTHER PUBLICATIONS

Written Opinion for PCT/EP2019/070660 filed Jul. 31, 2019.
Search Report for German Patent Application No. 10 2018 123 284.5 filed Sep. 21, 2018.
International Preliminary Report on Patentability, dated Mar. 23, 2021, with Written Opinion for PCT/EP2019/070660 (English translation) (5 pages).

* cited by examiner

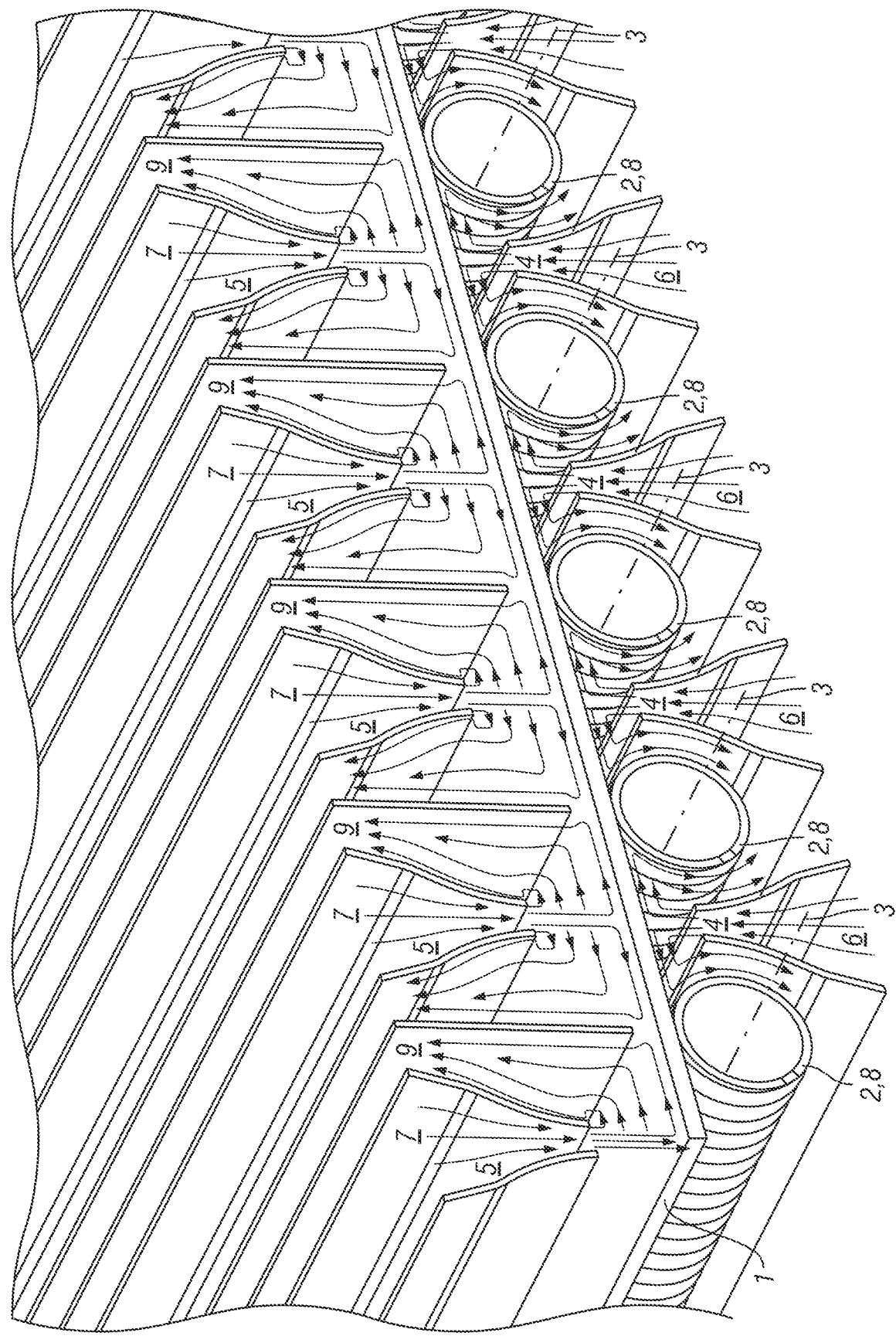

DEVICE FOR ANNEALING GLASS PANES

FIELD OF THE INVENTION

The invention concerns a device for annealing glass panes.

BACKGROUND

It is known from the prior art, for example, DE 10 2008 045 416 A1, that glass panes can be thermally prestressed. So-called tempered safety glass is produced by the process of thermal prestressing. During thermal prestressing, a tensile stress is produced by heat treatment (annealing) on the interior of the glass pane and a compressive stress on the surfaces and on the edges. Compressive stresses develop in the glass because of this, which leads to increased tensile bending strength of the glass panes thus produced. The glass is also more resistant to temperature differences and shatters into small fragments when destroyed thereby resulting in a lower risk of injury.

Annealing generally occurs by first heating the entire glass pane to the softening point of the glass and then subjecting it to rapid cooling. In this way, however, more or less strong undesired anisotropies in the form of color defects develop as a result of birefringence during illumination with at least partially polarized light.

EP 2 853 517 B1 also deals with this problem and proposes an annealing procedure in which the glass pane is moved back and forth in a furnace and then guided to two cooling areas, in which, in the first cooling area, cooling air is directed onto the surface of the glass panes through slit nozzles and, in the second cooling area cooling air is directed onto the surface of the glass panes through hole-like nozzles, in which case the glass pane is moved back and forth in both cooling areas on rollers. Both surfaces of the glass pane can be cooled with cooling air in both cooling areas. The rollers on which the glass panes are guided are fully wrapped with cords.

However, interfering anisotropies in the glass panes are still generated in this procedure. Guiding of the cooling air is also irregular, turbulent and not very effective.

The object of DE 693 12 169 T2 is a method and device for producing bent glass panes, which are heated to a bending temperature by passing these glass panes past a shaping bed with an essentially circular and conical guide profile, the shaping bed being formed from an arrangement of rollers that drive the glass pane, and the bed being formed from a hot air cushion. The rollers here extend to both sides of the glass pane being transported and bent and are in contact with the glass pane on both sides. Flow channels are arranged between the rollers. Documents U.S. Pat. No. 3,881,907, EP 1 957 419 B1 and U.S. Pat. No. 4,820,327 also deal with methods and devices for annealing glass panes and show slit-like nozzles as well as partitioning of an annealing station into several parts.

A drawback of the described device and method presented is the high demand on the guide rollers, which are to be arranged on both sides of the glass pane and adjusted so that the upper guide rollers also exert an identical pressure on the glass pane as the lower guide rollers on which the glass pane rests by its own weight. The device is therefore complex and expensive to produce and operate.

SUMMARY OF THE INVENTION

One aspect of the invention relates to a device for annealing of glass panes that is suitable to produce and operate and in which the cooling air acts as effectively as possible on both surfaces of the glass pane and anisotropies are also reduced within the glass.

Advantageous embodiments are disclosed.

BRIEF DESCRIPTION OF THE DRAWING

A practical example of the invention is further explained below with reference to the accompanying drawing. This shows a perspective side view of a glass pane in an annealing device according to the invention in which the cooling air flow is shown by arrows.

DETAILED DESCRIPTION

The FIGURE shows a glass pane 1, which is subjected to annealing in the device shown. The underside of the glass pane 1 lies on rollers 2, which are mounted so as to rotate about axes 3. The glass pane 1 can be transported on these rollers 2 or also moved back and forth, by driving the rollers 2 accordingly, which is not shown in detail. The rollers 2 are provided with a coating which can be a strip consisting of aramid or Kevlar or another appropriate material. The choice of coating is determined by the high temperature of the heated glass coming from the furnace, which is between 600 and 700° C.

A flow channel 4, which extends over the width of the glass pane and is designed continuous, is situated between two adjacent rollers 2. As shown in the FIGURE, the sides 8 of the flow channel 4 extend between adjacent rollers 2 so that the cooling air 6 emerges from the flow channels 4 in the direction toward the underside of the glass pane 1 in the region of the joining plane of the axes 3 of rollers 2 or even after them, i.e., closer to the underside of the glass pane 1. As shown in the FIGURE, the flow channels 4 are initially wide and then increasingly narrow in the direction toward the glass pane 1 so that a tapering flow channel is formed that extends over the entire width of the device, i.e., the length of the rollers 2 and the width of the glass pane 1. The tapering structure of these flow channels 4 corresponds roughly to an inverted "V".

Since the rollers 2 are situated between adjacent flow channels 4, which, since they carry the glass pane 1, extend right up to it, the individual flow channels are shown in the FIGURE by the arrows indicating the air flow. Each flow parcel has a flow channel 4 that supplies the cooling air 6. This is then reflected on the underside of a glass pane 1 and directed outward in the direction toward the rollers 2 and then deflected downward so that it flows laterally from the flow channel 4.

The top of the glass pane 1 facing away from rollers 2 is also exposed to cooling air 7, which flows from identically or similarly designed flow channels 5 that are arranged above the glass pane 1 and also have roughly the cross-sectional shape of a "V" so that they form a continuous flow channel via which cooling air 7 is blown onto the upper surface of the glass pane 1. The upper flow channels 5 also extend over the entire width of the device, i.e., the length of the rollers 2 and the width of the glass pane 1. The upper flow nozzles 5 are arranged so that they are roughly flush with the lower opposite flow channels.

There are no rollers 2 above the glass pane 1 for forming a natural partition between the flow channels 5. For this reason, partitions formed by wall elements 9 are formed between the upper flow channels 5, whose distance to the glass panes 1 is as small as possible during operation of the device and is a maximum of 10 mm. The wall elements 9 run parallel to the flow channels 5.

Owing to the arrangement, flow parcels are formed both beneath the glass pane 1 and above the glass pane 1. During operation of the device, cooling air 6 is guided in the direction of the underside of the glass pane 1 by the flow channels 4 arranged beneath the glass pane 1. This cooling air 6 is marked by flow arrows. The cooling air 6 strikes the underside of the glass pane 1 approximately orthogonally, is deflected therefrom to both sides and then strikes the top of coated rollers 2. Owing to continuous coating of the rollers 2, a fully closed flow cell is created here and the cooling air 6 is then diverted downward and guided out into the open on both outer sides of the flow channel 4.

Flow occurs similarly on the top of glass pane 1. The cooling air 7 is blown out from the flow channels 5 downward in the direction of the top of glass pane 1, diverted from there leftward and rightward until it reaches the wall elements 9 extending just above the top of glass pane 1. The largest portion of the cooling air 7 is then diverted upward on these wall elements 9 and reaches the outside via the outer sides of the flow channel 5.

By means of the arrangement according to the invention, defined flow parcels are produced both beneath the glass pane 1 and above the glass pane 1, which are formed beneath the glass pane 1 by two adjacent rollers 2 and above the glass pane 1 by two adjacent wall elements 9. Due to the continuous, very wide flow channels 4 and 5, it is also possible to guide a considerable amount of air at low speed, i.e., a high volume of air at low pressure, onto both sides of the glass pane 1, which in turn enables a laminar flow at high cooling performance. By eliminating any turbulence and by means of this laminar flow, not only is a more uniform cooling of the glass pane 1 and therefore a lower optical anisotropy guaranteed, but also a higher efficiency of the cooling performance, which requires up to 50% less energy than known systems.

A significant improvement in tensile bending strength of the treated glass panes is also obtained by applying the device according to the invention. Due to the more uniformly applied prestressing in the glass, the limit stresses leading to breakage are not reached as early as in the method according to the prior art.

The invention claimed is:

1. A device for annealing a glass pane, the device comprising:
    a plurality of rollers on which the glass pane can be transported horizontally,
    a plurality of first cooling air feeds running parallel to axes of the rollers, from which cooling air can be guided onto an underside of the glass pane, each of the first cooling air feeds being arranged between two of the rollers;
    a plurality of second cooling air feeds running parallel to the axes of the rollers, from which cooling air can be guided onto a top surface of the glass pane, each of the second cooling air feeds being arranged above the glass pane, and each of the first and second cooling air feeds extending over a width of the glass pane; and
    upper partitions arranged on both parallel sides of each of the second cooling air feeds, wherein the rollers form lower partitions and are arranged on both parallel sides of each of the first cooling air feeds, and
    the upper partitions being a flat wall with a thickness of the flat wall is less than a diameter of the roller and extending to a distance of no more than 10 mm from the glass pane,
    and with each of the first and second cooling air feeds being formed as a nozzle having a slit with the nozzle becoming increasingly narrow in the direction toward to glass pane so as to form a flow channel extending over the width of the glass pane that continuously tapers to where the cooling air emerges from the flow channel, such that the cooling air from each of the first cooling air feeds strikes the underside of the glass pane, is deflected outward to both sides toward the rollers forming the lower partitions, and then strikes the rollers and is diverted downward such that return of this cooling air deflected from the glass pane occurs between the rollers forming the lower partitions and outer sides of the continuous tapering flow channel at the first cooling air feed,
    and the cooling air from each of the second cooling air feeds strikes the top surface of the glass pane, is deflected outward to both sides toward the flat walls forming the upper partitions, and then strikes the flat walls and is diverted upward such that return of this cooling air deflected from the glass pane occurs between the flat walls forming the upper partitions and outer sides of the continuous tapering flow channel of the second cooling air feed.

2. The device according to claim 1, wherein each of the rollers is fully wrapped.

3. The device according to claim 1, wherein each of the flat walls is flat through its entire length.

4. The device according to claim 1, wherein each of the flat walls is configured to not deflect the cooling air that strikes that flat wall back toward the glass pane.

5. The device according to claim 1, wherein the nozzle of each of the first and second cooling air feeds continuously tapers along its entire length so as to be substantially "V"-shaped in cross-section.

6. The device according to claim 1, wherein each of the rollers has a coating.

7. A device for annealing a glass pane, the device comprising:
    a plurality of rollers on which the glass pane can be transported horizontally;
    a plurality of first cooling air feeds running parallel to axes of the rollers, from which cooling air can be guided onto an underside of the glass pane, each of the first cooling air feeds being arranged between two of the rollers;
    a plurality of second cooling air feeds running parallel to the axes of the rollers from which cooling air can be guided onto a top surface of the glass pane, each of the second cooling air feeds being arranged above the glass pane, and each of the first and second cooling air feeds extending across a width of the glass pane; and
    a plurality of flat walls running parallel to the second cooling air feeds with a thickness of the flat wall is less than a diameter of the rollers, each of the second cooling air feeds being arranged between two of the flat walls,
    wherein each of the flat walls extends to a distance of no more than 10 mm from the glass pane and each of the first and second cooling air feeds is formed as a nozzle having a slight with the nozzle becoming increasingly narrow along its entire length in the direction toward the glass pane so as to form a substantially "V"-shaped flow channel extending across the width of the glass pane that continuously tapers along its entire length such that the cooling air from each of the first cooling air feeds strikes the underside of the glass pane, is deflected outward to both sides toward the rollers, and strikes the rollers and is diverted downward such that return of this cooling air deflected from the glass pane occurs between the rollers and outer sides of the flow channel of the first cooling air feed, and the cooling air from each of the second cooling air feeds strikes the top surface of the glass pane, is deflected outward to both sides toward the flat walls, strikes the flat walls, and is deflected upward such that return of this cooling air deflected from the glass pane occurs between the flat walls and outer sides of the continuous tapering flow channel of the second cooling air feed.

8. The device according to claim 7, wherein each of the rollers is fully wrapped.

9. The device according to claim 7, wherein each of the rollers has a coating.

10. A method for annealing a glass pane, the method comprising:
transporting the glass pane horizontally on rollers;
providing flat vertical walls that run parallel to axes of the rollers, each of the flat vertical walls being arranged above the glass pane so as to extend to a distance of no more than 10 mm from the glass pane and a thickness of the flat vertical wall is less than a diameter of the roller;
guiding cooling air from first cooling air feeds, each of which is arranged between two of the rollers and runs parallel to the axes of the rollers, onto an underside of the glass pane, each of the first cooling air feeds extending over a width of the glass pane; and
guiding cooling air from second cooling air feeds, each of which is arranged between two of the flat vertical walls and runs parallel to the axes of the rollers, onto a top of the glass pane, each of the second cooling air feeds extending over a width of the glass pane,
wherein each of the first and second cooling air feeds comprises a nozzle having a slit with the nozzle becoming increasingly narrow in the direction toward the glass pane so as to form a flow channel extending across the width of the glass pane that is substantially "V"-shaped in cross-section and continuously tapers to where the cooling air emerges from the flow channel,
the cooling air from each of the first cooling air feeds strikes the underside of the glass pane, is deflected outward to both sides toward the rollers, and strikes the rollers and is diverted downward such that return of this cooling air occurs between the rollers and outer sides of the first cooling air feeds, and
the cooling air from each of the second cooling air feeds strikes the top of the glass pane, is deflected outward to both sides toward the flat vertical walls, and strikes the flat vertical walls and is diverted upward such that return of this cooling air occurs between the flat vertical walls and outer sides of the second cooling air feeds.

11. The method according to claim 10,
wherein each of the first cooling air feeds and the two adjacent rollers form a lower flow parcel beneath the glass pane, and each of the second cooling air feeds and the two adjacent flat vertical walls form an upper flow parcel above the glass pane, and
the flow rate of the cooling air through each of the first and second cooling air feeds is limited so that laminar flows form in the upper and lower flow parcels.

12. The method according to claim 10,
wherein each of the first cooling air feeds and the two adjacent rollers form a lower flow parcel beneath the glass pane, and each of the second cooling air feeds and the two adjacent flat vertical walls form an upper flow parcel above the glass pane, and
the cooling air is guided from the first and second cooling air feeds onto both sides of the glass pane at a volume and pressure that produces a laminar flow in the upper and lower flow parcels.

13. The method according to claim 10, wherein each of the flat vertical walls diverts upward, not downward toward the glass pane, the cooling air that strikes that flat vertical wall.

\* \* \* \* \*